United States Patent
Horner et al.

(10) Patent No.: US 9,783,306 B2
(45) Date of Patent: Oct. 10, 2017

(54) BI-FOLD THRUST RECOVERY OUTFLOW VALVE WITH A RAM AIR FLAP

(71) Applicant: HONEYWELL INTERNATIONAL INC., Morris Plains, NJ (US)

(72) Inventors: Darrell Horner, Oro Valley, AZ (US); Megan Elizabeth Inscho, Tucson, AZ (US); Christopher Thomas, Tucson, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 175 days.

(21) Appl. No.: 14/881,788

(22) Filed: Oct. 13, 2015

(65) Prior Publication Data

US 2017/0101189 A1 Apr. 13, 2017

(51) Int. Cl.
*B64D 13/02* (2006.01)

(52) U.S. Cl.
CPC .................... *B64D 13/02* (2013.01)

(58) Field of Classification Search
CPC ........ B64D 13/02; B64D 13/00; B64D 13/04; B64D 2013/003
See application file for complete search history.

(56) References Cited

U.S. PATENT DOCUMENTS

| | | | |
|---|---|---|---|
| 3,436,039 A * | 4/1969 | Emmons | B64D 13/02 244/129.5 |
| 5,046,686 A | 9/1991 | Carla et al. | |
| 6,273,136 B1 * | 8/2001 | Steinert | B64D 13/02 137/601.08 |
| 6,634,597 B2 | 10/2003 | Johnson et al. | |
| 7,461,814 B2 | 12/2008 | Hein et al. | |
| 7,849,702 B2 | 12/2010 | Parikh | |
| 8,240,331 B2 | 8/2012 | Appleby et al. | |
| 8,360,358 B2 | 1/2013 | Klimpel | |
| 2010/0001127 A1 | 1/2010 | Petrac | |
| 2010/0096503 A1 | 4/2010 | Tanner et al. | |
| 2010/0216385 A1 | 8/2010 | Heuer | |
| 2013/0059517 A1 * | 3/2013 | Horner | B64D 13/02 454/71 |
| 2013/0186497 A1 * | 7/2013 | Royalty | B64D 13/02 137/899.2 |
| 2013/0210330 A1 * | 8/2013 | Steinert | B64D 13/02 454/73 |

(Continued)

OTHER PUBLICATIONS

Extended EP Search Report for Application No. 16193604.2-1754 dated Apr. 24, 2017

*Primary Examiner* — Justin Benedik
(74) *Attorney, Agent, or Firm* — Lorenz & Kopf, LLP

(57) ABSTRACT

A thrust recovery outflow valve includes a valve frame for mounting on an aircraft exterior skin and a bi-fold valve door that is mounted within the valve frame. The bi-fold valve door includes an aft door section, a forward door section, and a ram air flap. The aft door section is rotatable between an aft door closed position and an aft door full-open position and has a ram air opening formed therein. The forward door section is rotatable between a forward door closed position and a forward door full-open position. The ram air flap is rotationally mounted on the aft door section and is rotatable between a flap closed position, which prevents air flow through the ram air opening, and a flap open position, which allows air flow through the ram air opening.

20 Claims, 7 Drawing Sheets

(56) References Cited

U.S. PATENT DOCUMENTS

2014/0227956 A1* 8/2014 Steinert ................ B64D 13/02
                                                      454/73
2014/0311595 A1* 10/2014 Bagge ..................... F16K 1/20
                                                      137/527

* cited by examiner

BI-FOLD THRUST RECOVERY OUTFLOW VALVE WITH A RAM AIR FLAP

TECHNICAL FIELD

The present invention generally relates to aircraft cabin pressure thrust recovery systems, and more particularly relates to a cabin pressure bi-fold thrust recovery outflow valve that has a ram air flap.

BACKGROUND

During flight, an aircraft cabin is typically pressurized with air that is supplied from the engine bleed air and air conditioning systems. In the highly unlikely, yet postulated, event that airflow from these systems is lost during flight, which is generally referred to as a "loss of inflow," fresh air ventilation still needs to be provided for the cabin occupants to ensure that carbon dioxide does not build-up to undesirable levels. Traditionally, for relatively large aircraft, this function is provided by a dedicated emergency ram air inlet valve (a ram air scoop mounted on the fuselage).

Unfortunately, dedicated emergency ram air inlet valves exhibit cost and weight penalties. As such, several attempts have been made to use existing cabin pressure control thrust recovery valves to also implement the functionality of the emergency ram air inlet valve. However, the basic shape of traditional thrust recovery valves allows some cabin air to exhaust along with the ram air inlet, which results in a lower net ingress of airflow into the aircraft cabin than desired.

Hence, there is a need for a cabin pressure control thrust recovery valve that also implements the functionality of an emergency ram air inlet valve while preventing, or at least significantly inhibiting, cabin air to exhaust along with the ram air inlet. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a thrust recovery outflow valve includes a valve frame and a bi-fold valve door. The valve frame is configured to be mounted on an aircraft exterior skin and includes an inner surface that defines a flow passage through the valve frame. The bi-fold valve door is mounted within the valve frame and includes an aft door section, a forward door section, and a ram air flap. The aft door section is rotationally coupled to the valve frame and is rotatable, relative to the valve frame and about a first rotational axis, between an aft door closed position and an aft door full-open position. The aft door section also has a ram air opening formed therein. The forward door section is rotationally coupled to the aft door section and is configured to receive a rotational drive torque. The forward door section is rotatable, relative to the valve frame and the aft door section and about a second rotational axis that is separate from the first rotational axis, between a forward door closed position and a forward door full-open position. The ram air flap is rotationally mounted on the aft door section and is rotatable, relative to the aft door section and about a third rotational axis that is separate from the first and second rotational axes, between a flap closed position, which prevents air flow through the ram air opening, and a flap open position, which allows air flow through the ram air opening.

In another embodiment, a thrust recovery outflow valve includes a valve frame and a bi-fold valve door. The valve frame is configured to be mounted on an aircraft exterior skin and includes an inner surface that defines a flow passage through the valve frame. The bi-fold valve door is mounted within the valve frame and includes an aft door section, a forward door section, a ram air flap, and a spring. The aft door section is rotationally coupled to the valve frame and is rotatable, relative to the valve frame and about a first rotational axis, between an aft door closed position and an aft door full-open position. The aft door section also has a ram air opening formed therein. The forward door section is rotationally coupled to the aft door section and is configured to receive a rotational drive torque. The forward door section is rotatable, relative to the valve frame and the aft door section and about a second rotational axis that is separate from the first rotational axis, between a forward door closed position and a forward door full-open position. The ram air flap is rotationally mounted on the aft door section and is rotatable, relative to the aft door section and about a third rotational axis that is separate from the first and second rotational axes, between a flap closed position, which prevents air flow through the ram air opening, and a plurality of flap open positions between the flap closed position and a flap full-open position, which allows air flow through. The spring is coupled to the aft door section and the ram air flap, and supplies a bias force to the ram air flap that urges the ram air flap to the flap closed position. The ram air flap is dimensioned such that, when the ram air flap is in the flap full-open position and the aft door section is in the aft door full-open position, the ram air flap engages the valve frame.

In yet another embodiment, a thrust recovery outflow valve includes an actuator, a valve frame, and a bi-fold valve door. The actuator is configured to supply a rotational drive torque. The valve frame is configured to be mounted on an aircraft exterior skin and includes an inner surface that defines a flow passage through the valve frame. The bi-fold valve door is mounted within the valve frame and is coupled to the actuator. The bi-fold valve door includes an aft door section, a forward door section, a ram air flap, a spring, a door link, a drive link, and a coupler link. The aft door section is rotationally coupled to the valve frame and is rotatable, relative to the valve frame and about a first rotational axis, between an aft door closed position and an aft door full-open position. The aft door section also has a ram air opening formed therein. The forward door section is rotationally coupled to the aft door section and is coupled to receive the rotational drive torque from the actuator. The forward door section is rotatable, relative to the valve frame and the aft door section and about a second rotational axis that is separate from the first rotational axis, between a forward door closed position and a forward door full-open position. The ram air flap is rotationally mounted on the aft door section and is rotatable, relative to the aft door section and about a third rotational axis that is separate from the first and second rotational axes, between a flap closed position, which prevents air flow through the ram air opening, and a plurality of flap open positions between the flap closed position and a flap full-open position, which allows air flow through. The spring is coupled to the aft door section and the ram air flap, and supplies a bias force to the ram air flap that urges the ram air flap to the flap closed position. The door link is coupled to and extends from the forward door section, and is further coupled to receive the rotational drive torque from the actuator. The drive link is coupled to the actuator, and the coupler link is coupled between the drive link and the door link. The ram air flap is dimensioned such that, when the ram air flap is in the flap full-open position and the aft door section is in the aft door full-open position, the ram air flap engages the valve frame.

Furthermore, other desirable features and characteristics of the cabin pressure control system thrust recovery outflow valve and method will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
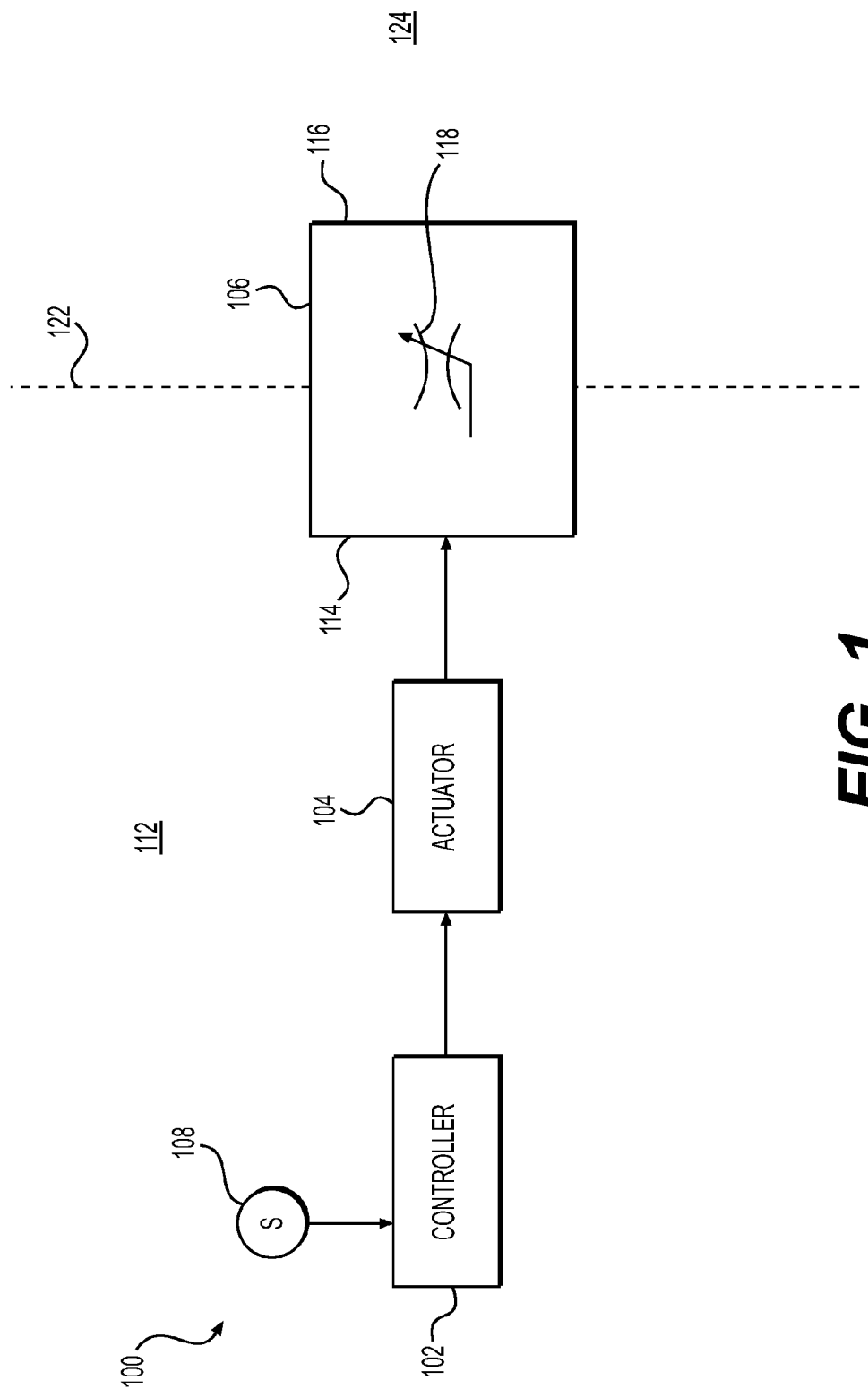
FIG. 1 is a functional block diagram of an exemplary cabin pressure control system (CPCS)

Turning first to FIG. 1, a simplified block diagram of an exemplary aircraft cabin pressure control system (CPCS) 100 is depicted. In the depicted embodiment, the CPCS includes a controller 102, an actuator 104, and a thrust recovery outflow valve 106. The controller 102 is operatively (e.g., electrically) coupled to the actuator 104, which is, in turn, mechanically coupled to the thrust recovery outflow valve 106. During operation of the CPCS 100, the controller 102 commands the actuator 104 to move the thrust recovery outflow valve 106 to various positions, to thereby modulate cabin pressure and/or cabin pressure rate-of-change.

It will be appreciated that the controller 102 may command the actuator 104 to move the thrust recovery outflow valve 106 in accordance with a predetermined schedule or as a function of one or more sensed parameters. In the depicted embodiment, the CPCS 100 further includes one or more cabin pressure sensors 108 (only one shown for clarity) that sense pressure within the aircraft cabin 112 and supply a cabin pressure sensor signal representative thereof to the controller 102. It will additionally be appreciated that the CPCS 100 may be implemented with various other sensors, such as one or more non-illustrated cabin temperature sensors, one or more non-illustrated cabin-to-atmosphere differential pressure sensors, one or more non-illustrated atmospheric pressure sensors, and one or more outflow valve position sensors, just to name a few.

Figure 2:
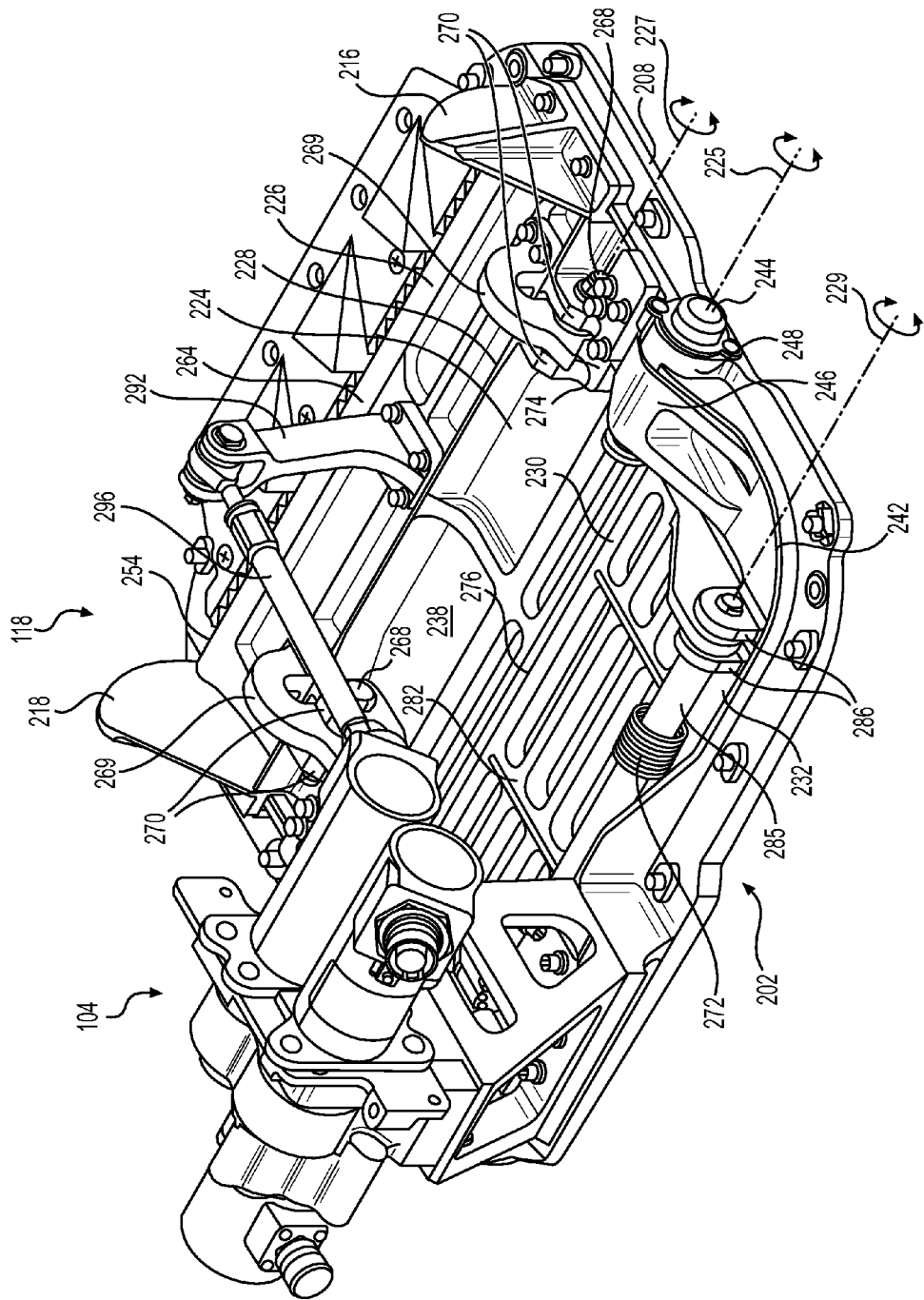
FIG. 2 depicts a perspective plan view of one example embodiment of a thrust recovery outflow valve that may be used in the system of FIG. 1.
Figure 3:
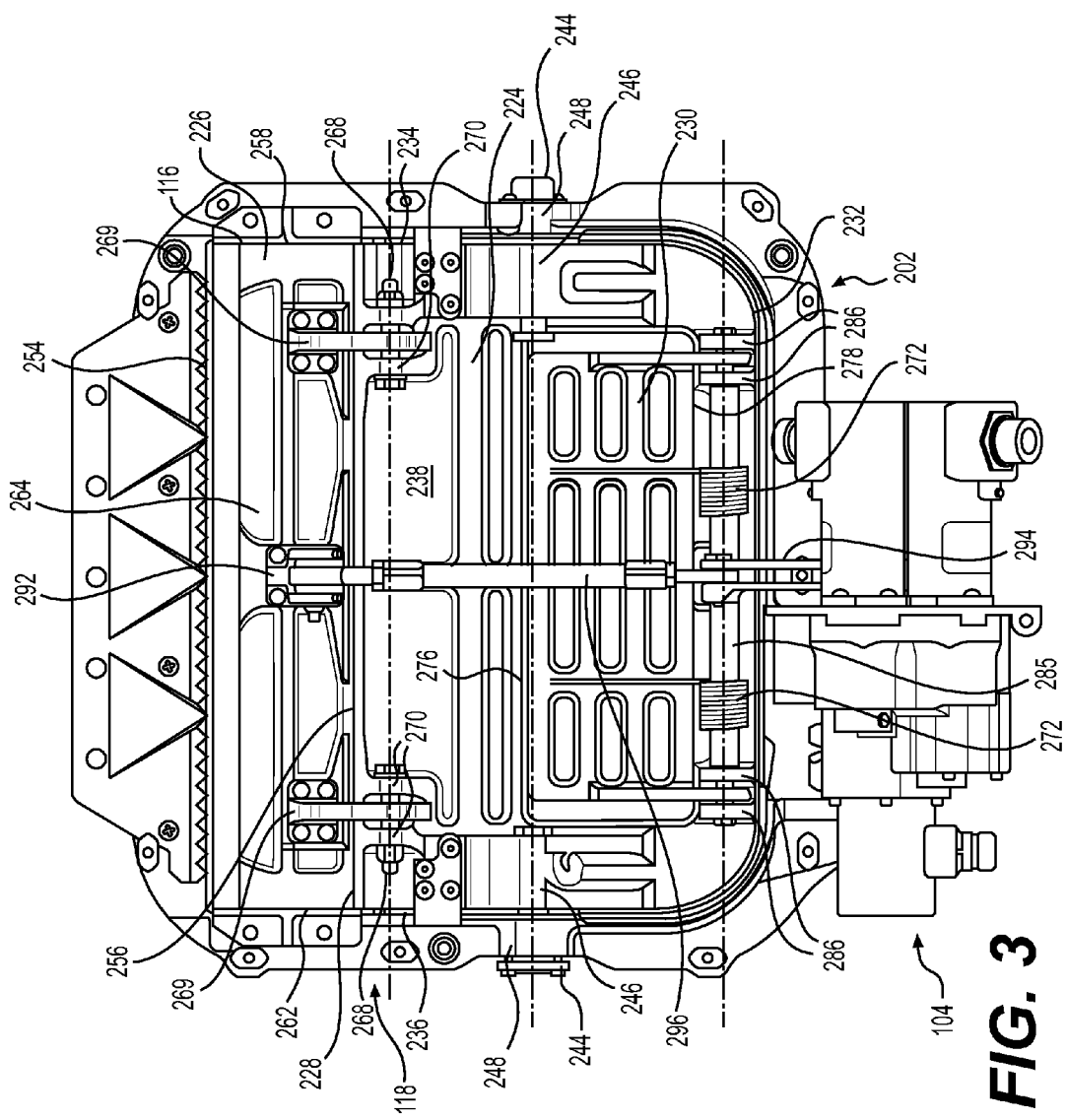
FIG. 3 depicts a top view of the example thrust recovery outflow valve of FIG. 2.
Figure 4:
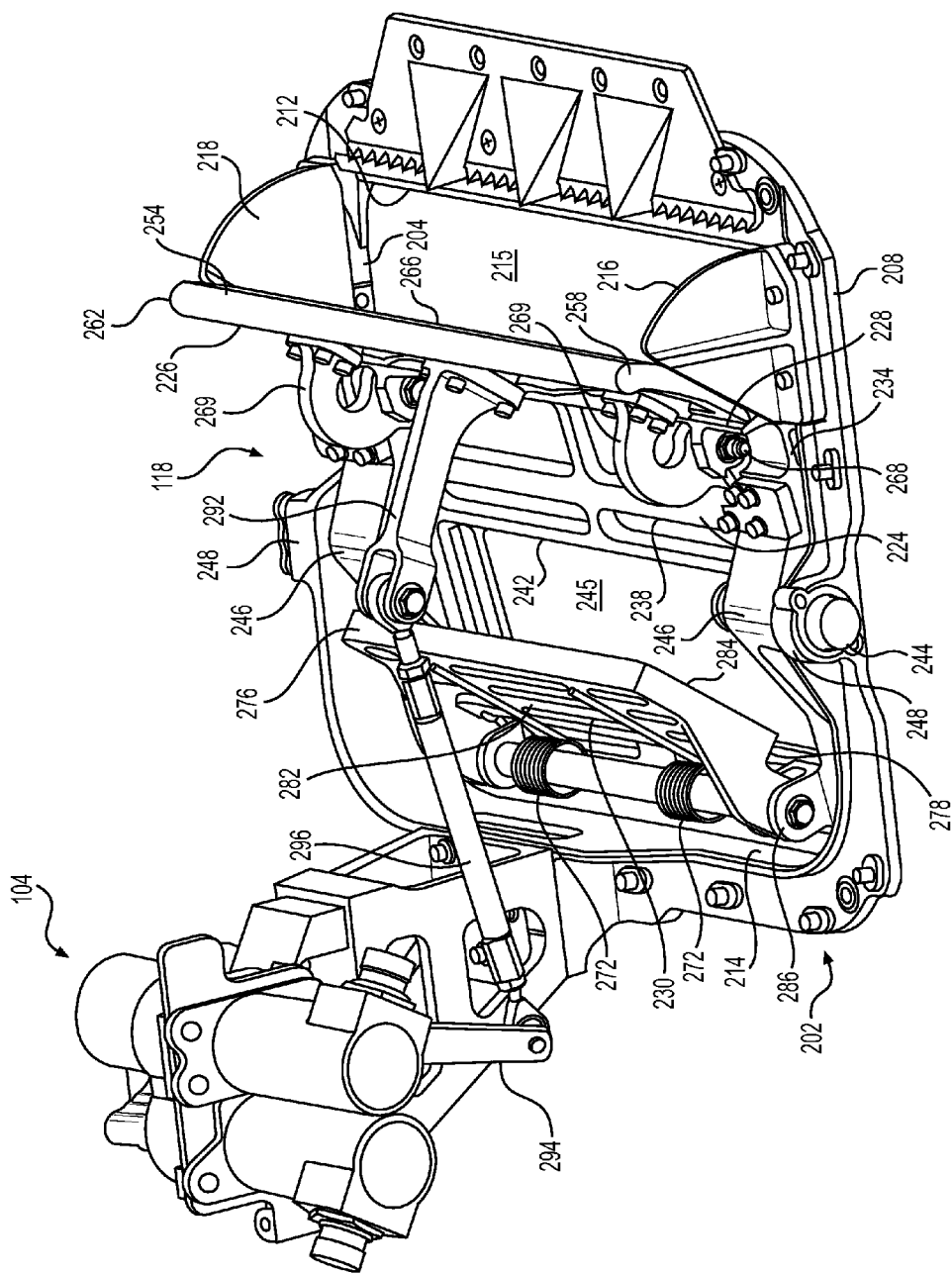
FIG. 4 depicts the perspective plan view of the example thrust recovery outflow valve of FIG. 2 with portions of the valve in open positions.
Figure 5:
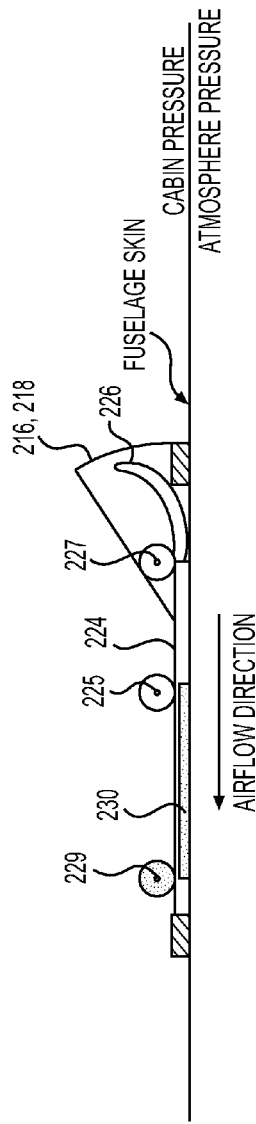
FIGS. 5-11 depict simplified cross section views of the exemplary thrust recovery outflow valve of FIGS. 2-4 in a various valve positions.

The thrust recovery outflow valve 106 includes an inlet flow port 114, an outlet flow port 116, and an interposed valve 118. The thrust recovery outflow valve 106 is, for example, preferably mounted on the aircraft exterior skin 122 such that the inlet flow port 114 is exposed to the aircraft cabin 112 and the outlet flow port 116 is exposed to the atmosphere outside of the aircraft 124. Thus, during flight, the pressure in the aircraft cabin 112 (e.g., cabin altitude) and/or the rate of change of aircraft cabin altitude, can be controlled by positioning the valve element 118, via the actuator 104. In one specific implementation, the thrust recovery outflow valve 106 is located in the rear underbelly of the aircraft proximate the tail. Moreover, in some implementations, the thrust recovery outflow valve 106 may be positioned so that additional forward thrust is supplied to the aircraft when pressurized air is venting from the aircraft cabin 112 to the atmosphere 124 outside the aircraft. It will be appreciated that the thrust recovery outflow valve 106 may be variously configured to implement this functionality. One particular physical implementation is depicted in FIGS. 2-4, and with reference thereto will now be described.

The exemplary physical implementation of the thrust recovery outflow valve 106 includes a valve frame 202, the valve element 118, and the actuator 104. The valve frame 202 is configured to be mounted on the aircraft exterior skin 122, and includes an inner surface 204, an outer surface 208, a forward seat 212, and an aft seat 214. The inner surface 204 defines a flow passage 215 through the valve frame 202 between the inlet flow port 114 and the outlet flow port 116 (neither depicted in FIGS. 2-4). As FIGS. 2-4 also depict, the valve frame 202 may additionally include a first side seat 216 and a second side seat 218. The first and second side seats 216, 218 extend perpendicularly from the valve frame 202 on opposing sides of the forward seat 212, and are disposed parallel to each other. The function of the first and second side seats 216, 218 will be described further below. It will be appreciated that the depicted shapes and configurations of the forward seat 212, the aft seat 214, and the first and second side seats 216, 218 are merely exemplary of one embodiment, and that the shapes and configurations thereof may vary.

The valve element 118, which is implemented as a bi-fold valve door, is mounted within the valve frame 202 and includes an aft door section 224, a forward door section 226, and a ram air flap 230. The bi-fold valve door 118 is preferably manufactured from any one of numerous non-metallic composite materials, thereby exhibiting a relatively light weight. It will be appreciated that numerous metallic materials could also be used.

The aft door section 224 is rotationally coupled to the valve frame 202, and includes an aft door section leading edge 228, an aft door section trailing edge 232, an aft door section first side edge 234, an aft door section second side edge 236, an aft door section first side 238, and an aft door section second side 242. Although the manner in which the aft door section 224 is rotationally coupled to the valve frame 202 may vary, in the depicted embodiment the aft door section 224 is rotationally coupled to the valve frame 202 via a plurality of hinges 244.

In the depicted embodiment, the hinges 244 are disposed in hinge mounts 246 and in bearing supports 248. The hinge mounts 246 are coupled to, or integrally formed with, the aft door section 224, and the bearing supports 248 are coupled to, or integrally formed on, the valve frame 202. The hinge mounts 246 are located between the aft door section leading and trailing edges 228, 232, and are preferably disposed slightly closer to the aft door section trailing edge 232. With this location, when the ram air flap 230 is in the flap closed position and a greater pressure is applied to the aft door section first side 238 than to the aft door section second side 242, the aft door section 224 is pressure loaded toward its closed position. As will be described further below, the pressure loading overcomes any opening torque applied by the forward door section 226 until the forward door section 226 is mechanically coupled to the aft door section 224 as depicted in FIGS. 6-11.

As shown most clearly in FIG. 4, the aft door section 224 has a ram air opening 245 formed therein. The ram air opening 245 extends through the aft door section 224 between the aft door section first side 238 and the aft door section second side 242. The purpose of the ram air opening 245 will be described in more detail further below.

With the above-described configuration, it may be readily appreciated that the aft door section 224 is rotatable about a first rotational axis 225 relative to the valve frame 202. In particular, and as will be described further below, the aft door section 224 is rotatable, relative to the valve frame 202, about the first rotational axis 225 between an aft door closed position, which is the position depicted in FIGS. 2, 3, 5, and 6, and an aft door full-open position, which is the position depicted in FIGS. 7 and 8.

The forward door section 226 is rotationally coupled to the aft door section 224, and includes a forward door section leading edge 254, a forward door section trailing edge 256, a forward door section first side edge 258, a forward door section second side edge 262, a forward door section first side 264, and a forward door section second side 266. Although the manner in which the forward door section 226 is rotationally coupled to the aft door section 224 may vary, in the depicted embodiment the forward door section 226 is rotationally coupled to the aft door section 226 via a plurality of hinges 268 and a plurality of hinge links 269. In the depicted embodiment, the hinges 268 are disposed in hinge mounts 270 that are coupled to, or integrally formed in, the aft door section leading edge 228.

The hinge links 269 are coupled to, and rotate with, a separate one of the hinges 268, and are also coupled to the forward door section 226. The hinge links 269 also each include a mechanical stop surface 274. As will be described in more detail further below, when the forward door section 226 is rotated to the full-open position, the mechanical stop surface 274 on each hinge link 269 engages, and transfers rotational drive torque to, the aft door section 224.

With the above-described configuration, it may be readily appreciated that the forward door section 226 is rotatable about a second rotational axis 227 relative to the valve frame 202 and the aft door section 224. In particular, and as will be described further below, the forward door section 226 is rotatable, relative to the valve frame 202 and the aft door section 224, about the second rotational axis 227 between a forward door closed position, which is the position depicted in FIGS. 2, 3, and 5, and a forward door full-open position, which is the position depicted in FIGS. 4 and 6-11.

The ram air flap 230 is rotationally mounted on the aft door section 224 and includes a flap leading edge 276, a flap trailing edge 278, a flap first side 282, and a flap second side 284. Although the manner in which the ram air flap is rotationally mounted on the aft door section 224 may vary, in the depicted embodiment the ram air flap 230 is rotationally mounted on the aft door section 226 via a hinged shaft 285. The hinged shaft 285 is rotationally mounted in shaft mounts 286 that are coupled to, or integrally formed with, the aft door section 224 adjacent the aft door section trailing edge 232.

With the above-described configuration, the ram air flap 230 is rotatable about a third rotational axis 229 relative to the valve frame 202 and the aft door section 224. In particular, the ram air flap 230 is rotatable, relative to the valve frame 202 and the aft door section 224, about the third rotational axis 229 between a flap closed position, which is the position depicted in FIGS. 2, 3, 5-7, and 11, and a plurality of flap open positions, which are the positions depicted in FIGS. 4 and 8-10.

The rotation of the aft and forward door sections 224, 226 is facilitated via the actuator 104, which is configured to supply a rotational drive torque to the forward door section 226. Although the specific configuration and implementation of the actuator 104 may vary, in the depicted embodiment the actuator 104 is preferably implemented using an electric rotary actuator. The actuator 104 is also preferably coupled to the forward door section 226 via a plurality of links. In the depicted embodiment, this includes a door link 292, a drive link 294, and a coupler link 296. The door link 292 is fixedly coupled to, and extends from, the forward door section first side 264. The drive link 294 is coupled to the actuator 104 to receive the rotational drive torque therefrom. The coupler link 296 is coupled between the drive link 294 and the door link 292 to transfer the rotational drive torque from the actuator 104 to the forward valve door 226.

The rotation of the ram air flap 230 is facilitated via ram air pressure and via one or more springs 272. The springs 272, which are coupled to the aft door section 224 (via the hinged shaft 285) and the ram air flap 230, supply a bias force to the ram air flap 230 that urges the ram air flap 230 to the flap closed position. As will be described momentarily, under appropriate conditions, aerodynamic and pressure loading on the ram air flap 230 will move the ram air flap 230, against the force of the springs 272, to an open position. Although the depicted embodiment includes two springs 272, the valve 104 could be implemented with more or less than this number of springs 272. Moreover, although the depicted springs 272 are torsion springs, it will be appreciated that various other types of springs could be used.

Figure 6:
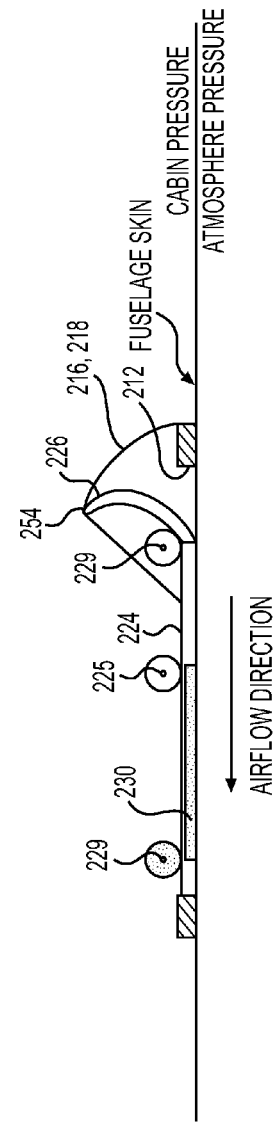

With reference now to FIGS. 5-11, operation of the bi-fold valve door 118 will be described. When the bi-fold valve door 118 is in the position depicted in FIG. 5, the aft door section 224 is in the aft door closed position, the forward door section 226 is in the forward door closed position, and the ram air flap 230 is in the flap closed position. Thereafter, and as depicted in FIG. 6, upon receiving a rotational drive torque from the actuator 104 in the appropriate direction, the forward door section 226 may be rotated, about the second rotational axis 227, out of the forward door closed position and toward the forward door full-open position. As may be appreciated, the forward door section 226 may be rotated to a plurality of positions between the forward door closed position and the forward door full-open position while, at the same time, the aft door section 224 and ram air flap 230 remain in the aft door closed position and the flap closed position, respectively. This allows the forward door section 226 to be rotated to any one of numerous partial-open positions (or to the forward door full-open position) during flight operations without creating unwanted drag. It should be noted that during flight operations a differential pressure across the aft door section 224 urges the aft door section 224 into the aft door closed position. Moreover, this same differential pressure, together with the bias force supplied by the one or more bias springs 272, urges the ram air flap 230 into the flap closed position.

Before proceeding further, it should additionally be noted that when the forward door section 226 is in (or between) the forward door closed position and the forward door full-open position, and the aft door section 224 and ram air flap 230 are simultaneously in the closed positions, the forward door section 226 engages the first and second side seats 216, 218 to direct the air into its greatest thrust producing path between the frame 202 forward seat 212 and the forward door leading edge 254. To this end, one or more non-depicted seals may be disposed in the forward door section first and second side edges 258, 262.

Figure 7:
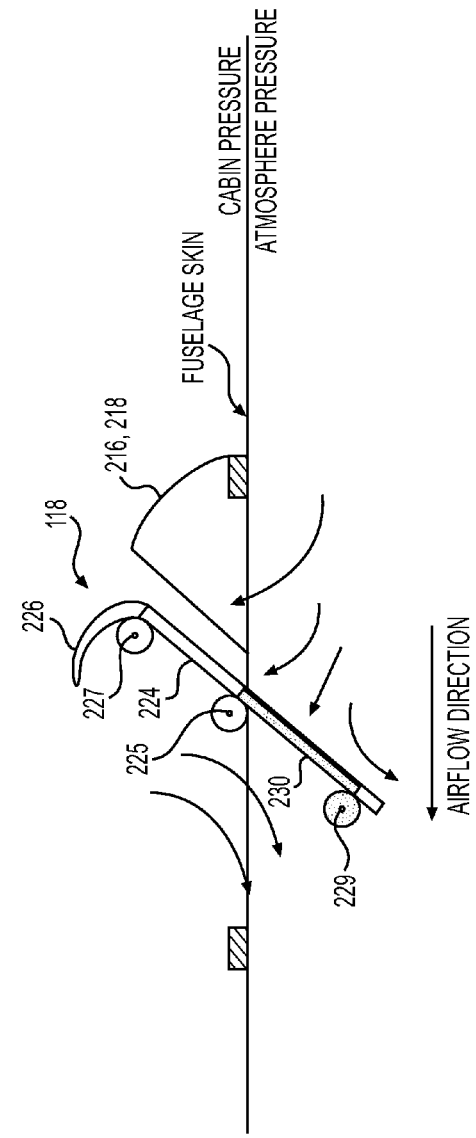

Turning now to FIG. 7, if rotational drive torque is supplied to the forward door section 226 when it is in the forward door section full-open position, the forward door section 226 engages the aft door section 224. More specifically, the mechanical stop surfaces 274 on the hinge links 269 engage the aft door section 224. As a result, the rotational drive torque being supplied to the forward door section 226 by the actuator 104 is transferred to the aft door section 224, which causes the aft door section 224 (together with the ram air flap 230) to rotate about the first rotational axis 225 from the aft door closed position to the aft door full-open position (or to a partial-open position between the aft door closed and full-open positions). As may be readily apparent, when the aft door section 224 is rotating about the first rotational axis 225, the forward door section 226 rotates simultaneously therewith about the first rotational axis 225, but does so relative to the valve frame 202 only (and not relative to the aft door section 224).

Figure 8:
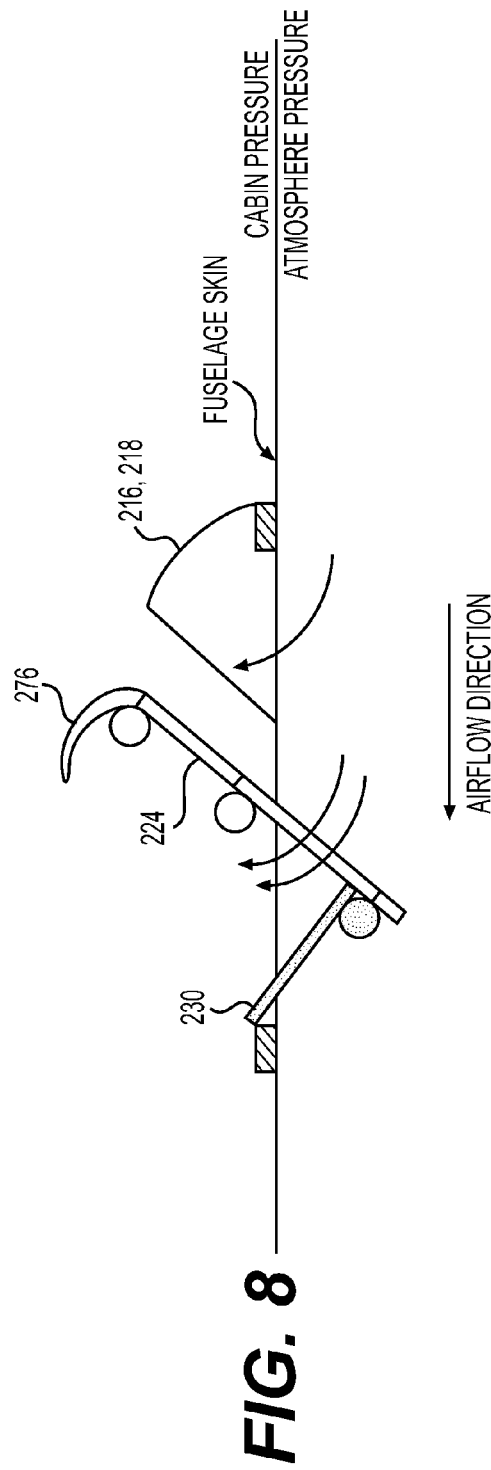

It should be noted that when an aircraft is in flight the valve element 118 is preferably rotated (either automatically or manually) so that the aft door section 224 is in the aft door full-open position only in the unlikely event of a loss of inflow, and when there is a very low cabin-to-ambient differential pressure. As FIG. 7 further depicts, when the aft door section 224 initially opens, and at various open positions between the aft door closed and full-open positions, airflow enters and exits the cabin 112 on both sides of the valve element 118. However, and as FIG. 8 depicts, when the aft door section 224 is at or near the aft door full-open position, force from the ram air overcomes any pressure in the cabin 112 and the bias force from the springs 272 that urges closes the ram air flap 230 into the flap closed position, and moves the ram air flap 230 to the flap open position. In the flap open position, the ram air flap 230 engages valve frame 202, blocking a large portion of the cabin air exhaust path, thus limiting the egress of air from the cabin 112. Moreover, ram air will ingress into the cabin 112, via both the flow passage 215 and the ram air passage 245, with relatively high velocity due to the angle of the ram air flap 230 and its position in the airplane boundary layer.

Figure 9:
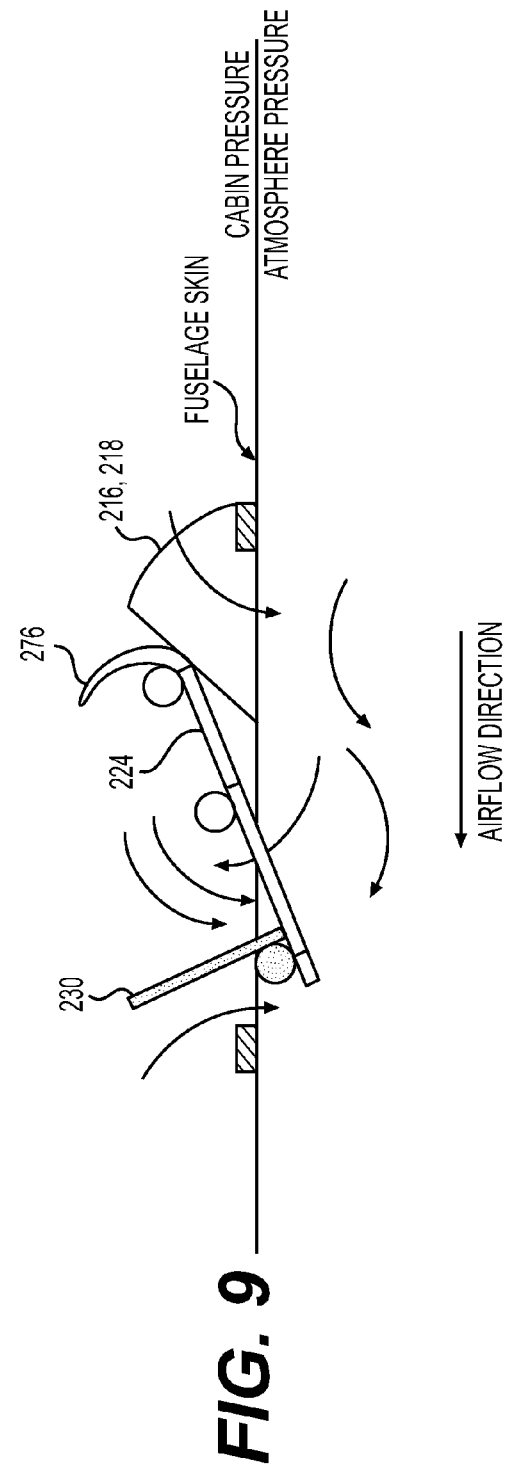
Figure 10:
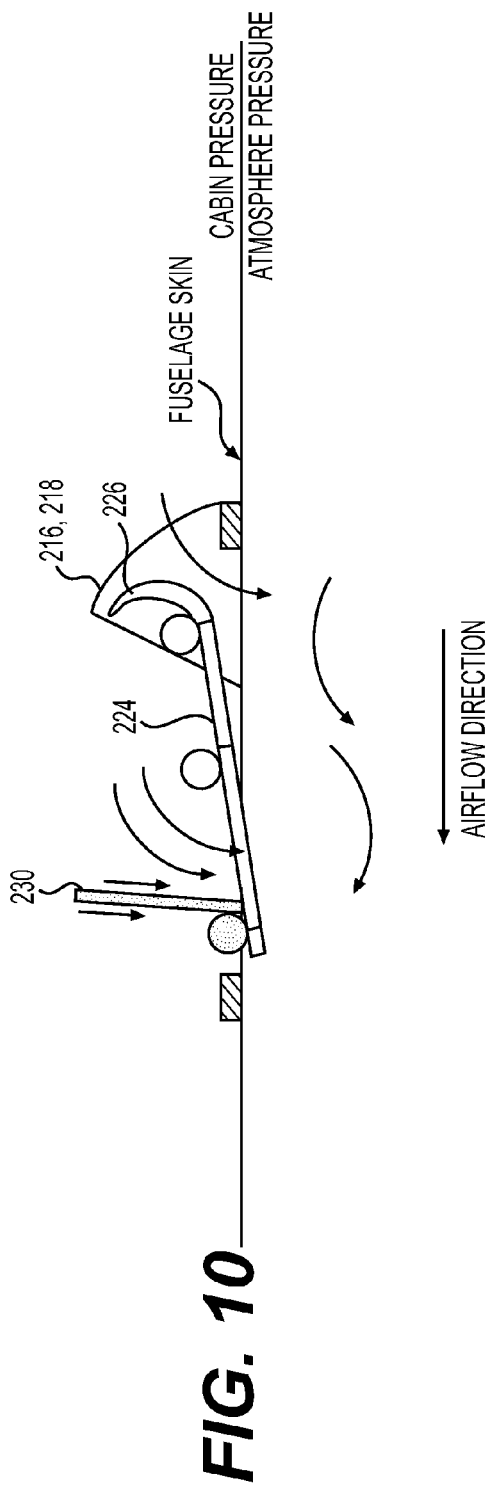
Figure 11:
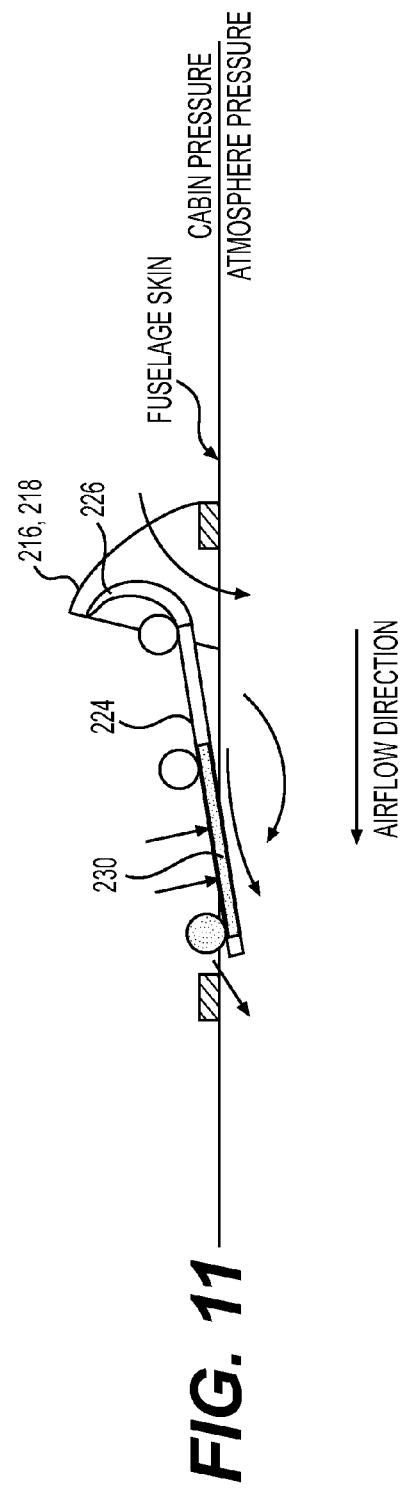

Thereafter, and as FIGS. 9 and 10 depict, when the valve element 118 is rotated (either manually or automatically) toward the closed position, which is preferably done after air is re-introduced into the cabin 112 and cabin differential pressure can again be regulated, pressure loading and the bias force from the springs 272 begin urging the ram air flap 230 toward the flap closed position. As FIG. 11 depicts, at some point, preferably before the aft door section 224 reaches the aft door closed position, cabin pressure and the bias force from the springs 272 move the ram air flap 230 to, and retain the ram air flap 230 in, the flap closed position.

With the above-described configuration, no mechanical or electro-mechanical actuator is needed to unlatch, latch, or rotate the ram air flap 230. Rather, aerodynamic and pressure loading open and shut the ram air flap 230, aided by the springs 272 to ensure the ram air flap 230 closes at the appropriate portion of the stroke. The single ram air flap 230 is disposed on the valve element 118, instead of being a stand-alone, dedicated valve, and opens only when the aft door section 224 is in the aft door full-open position and after cabin differential pressure is near-zero or negative.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A thrust recovery outflow valve, comprising:
   a valve frame configured to be mounted on an aircraft exterior skin, the valve frame including an inner surface that defines a flow passage through the valve frame; and
   a bi-fold valve door mounted within the valve frame, the bi-fold valve door comprising:
     an aft door section rotationally coupled to the valve frame and rotatable, relative to the valve frame and about a first rotational axis, between an aft door closed position and an aft door full-open position, the aft door section having a ram air opening formed therein,
     a forward door section rotationally coupled to the aft door section and configured to receive a rotational drive torque, the forward door section rotatable, relative to the valve frame and the aft door section and about a second rotational axis that is separate from the first rotational axis, between a forward door closed position and a forward door full-open position, and a ram air flap rotationally mounted on the aft door section and rotatable, relative to the aft door section and about a third rotational axis that is separate from the first and second rotational axes, between a flap closed position, which prevents air flow through the ram air opening, and a flap open position, which allows air flow through the ram air opening.

2. The valve of claim 1, wherein:

the ram air flap is movable to a flap full-open position; and the ram air flap is dimensioned such that, when the ram air flap is in the flap full-open position and the aft door section is in the aft door full-open position, the ram air flap engages the valve frame.

3. The valve of claim 1, further comprising:

a spring coupled to the aft door section and the ram air flap, the spring supplying a bias force to the ram air flap that urges the ram air flap to the flap closed position.

4. The valve of claim 3, wherein the spring comprises a torsion spring.

5. The valve of claim 3, wherein the spring comprises a pair of torsion springs.

6. The valve of claim 1, wherein the bi-fold valve door is configured such that when a positive pressure is applied from the cabin side of the bi-fold valve door:

the aft door section is in the aft door closed position whenever the forward door section is not in the forward door full-open position, the ram air flap is in the flap closed position whenever the aft door is in the aft door closed position, and when the forward door section is in the forward door full-open position, the forward door section engages the aft door section to selectively transfer rotational drive torque supplied to the forward door section to the aft door section to rotate the aft door section, simultaneously with the forward door section, about the first rotational axis, to thereby rotate the aft door section between the aft door closed position and the aft door full-open position.

7. The valve of claim 1, wherein:

the aft door section and comprises an aft door section leading edge and an aft door section trailing edge;

the aft door section is rotationally coupled to the valve frame between the aft door section leading edge and the aft door section trailing edge;

and the ram air flap is rotationally coupled to the aft door section adjacent the aft door section trailing edge.

8. The valve of claim 7, wherein:

the forward door section comprises a forward door section leading edge and a forward door section trailing edge; and the forward door section trailing edge is disposed adjacent to, and is rotationally coupled to, the aft door section leading edge.

9. The valve of claim 7, further comprising:

first and second side seats extending perpendicularly from the valve frame and disposed parallel to each other, the first and second side seats engaged by the forward door section when both (i) the forward door section is in or between the closed and full-open position and (ii) the aft door section is in the aft door closed position.

10. The valve of claim 1, further comprising:

an actuator coupled to the forward door section and configured to supply the rotational drive torque thereto;

a door link coupled to and extending from the forward door section, the door link further coupled to receive the rotational drive torque from the actuator;.

a drive link coupled to the actuator; and a coupler link coupled between the drive link and the door link.

11. A thrust recovery outflow valve, comprising:

a valve frame configured to be mounted on an aircraft exterior skin, the valve frame including an inner surface that defines a flow passage through the valve frame; and a bi-fold valve door mounted within the valve frame, the bi-fold valve door comprising:

an aft door section rotationally coupled to the valve frame and rotatable, relative to the valve frame and about a first rotational axis, between an aft door closed position and an aft door full-open position, the aft door section having a ram air opening formed therein, a forward door section rotationally coupled to the aft door section and configured to receive a rotational drive torque, the forward door section rotatable, relative to the valve frame and the aft door section and about a second rotational axis that is separate from the first rotational axis, between a forward door closed position and a forward door full-open position, a ram air flap rotationally mounted on the aft door section and rotatable, relative to the aft door section and about a third rotational axis that is separate from the first and second rotational axes, between a flap closed position, which prevents air flow through the ram air opening, and a plurality of flap open positions between the flap closed position and a flap full-open position, which allows air flow through, and a spring coupled to the aft door section and the ram air flap, the spring supplying a bias force to the ram air flap that urges the ram air flap to the flap closed position, wherein the ram air flap is dimensioned such that, when the ram air flap is in the flap full-open position and the aft door section is in the aft door full-open position, the ram air flap engages the valve frame.

12. The valve of claim 11, wherein the spring comprises a torsion spring.

13. The valve of claim 11, wherein the spring comprises a pair of torsion springs.

14. The valve of claim 11, wherein the bi-fold valve door is configured such that when a positive pressure is applied from the cabin side of the bi-fold valve door:

the aft door section is in the aft door closed position whenever the forward door section is not in the forward door full-open position, the ram air flap is in the flap closed position whenever the aft door is in the aft door closed position, and when the forward door section is in the forward door full-open position, the forward door section engages the aft door section to selectively transfer rotational drive torque supplied to the forward door section to the aft door section to rotate the aft door section, simultaneously with the forward door section, about the first rotational axis, to thereby rotate the aft door section between the aft door closed position and the aft door full-open position.

15. The valve of claim 11, wherein:
the aft door section and comprises an aft door section leading edge and an aft door section trailing edge;
the aft door section is rotationally coupled to the valve frame between the aft door section leading edge and the aft door section trailing edge;
and the ram air flap is rotationally coupled to the aft door section adjacent the aft door section trailing edge.

16. The valve of claim 15, wherein:
the forward door section comprises a forward door section leading edge and a forward door section trailing edge; and
the forward door section trailing edge is disposed adjacent to, and is rotationally coupled to, the aft door section leading edge.

17. The valve of claim 16, further comprising:
first and second side seats extending perpendicularly from the valve frame and disposed parallel to each other, the first and second side seats engaged by the forward door section when both (i) the forward door section is in or between the closed and full-open position and (ii) the aft door section is in the aft door closed position.

18. The valve of claim 11, further comprising:
an actuator coupled to the forward door section and configured to supply the rotational drive torque thereto.

19. The valve of claim 18, further comprising:
a door link coupled to and extending from the forward door section, the door link further coupled to receive the rotational drive torque from the actuator;
a drive link coupled to the actuator; and
a coupler link coupled between the drive link and the door link.

20. A thrust recovery outflow valve, comprising:
an actuator configured to supply a rotational drive torque;
a valve frame configured to be mounted on an aircraft exterior skin, the valve frame including an inner surface that defines a flow passage through the valve frame; and
a bi-fold valve door mounted within the valve frame and coupled to the actuator, the bi-fold valve door comprising:
an aft door section rotationally coupled to the valve frame and rotatable, relative to the valve frame and about a first rotational axis, between an aft door closed position and an aft door full-open position, the aft door section having a ram air opening formed therein,
a forward door section rotationally coupled to the aft door section and coupled to receive the rotational drive torque from the actuator, the forward door section rotatable, relative to the valve frame and the aft door section and about a second rotational axis that is separate from the first rotational axis, between a forward door closed position and a forward door full-open position,
a ram air flap rotationally mounted on the aft door section and rotatable, relative to the aft door section and about a third rotational axis that is separate from the first and second rotational axes, between a flap closed position, which prevents air flow through the ram air opening, and a plurality of flap open positions between the flap closed position and a flap full-open position, which allows air flow through,
a spring coupled to the aft door section and the ram air flap, the spring supplying a bias force to the ram air flap that urges the ram air flap to the flap closed position,
a door link coupled to and extending from the forward door section, the door link further coupled to receive the rotational drive torque from the actuator,
a drive link coupled to the actuator, and
a coupler link coupled between the drive link and the door link,
wherein the ram air flap is dimensioned such that, when the ram air flap is in the flap full-open position and the aft door section is in the aft door full-open position, the ram air flap engages the valve frame.

* * * * *

UNITED STATES PATENT AND TRADEMARK OFFICE
CERTIFICATE OF CORRECTION

PATENT NO. : 9,783,306 B2
APPLICATION NO. : 14/881788
DATED : October 10, 2017
INVENTOR(S) : Darrell Horner et al.

Page 1 of 1

It is certified that error appears in the above-identified patent and that said Letters Patent is hereby corrected as shown below:

In the Claims

Column 10, Line 3, Claim 10 delete "."

Signed and Sealed this
Sixteenth Day of January, 2018

Joseph Matal
*Performing the Functions and Duties of the
Under Secretary of Commerce for Intellectual Property and
Director of the United States Patent and Trademark Office*